US008269650B2

(12) United States Patent
Cornwall et al.

(10) Patent No.: US 8,269,650 B2
(45) Date of Patent: Sep. 18, 2012

(54) METER RIGHT SIZING

(75) Inventors: Mark K. Cornwall, Spokane, WA (US); Barry Cahill-O'Brien, Spokane, WA (US)

(73) Assignee: Itron, Inc., Liberty Lake, WA (US)

( * ) Notice: Subject to any disclaimer, the term of this patent is extended or adjusted under 35 U.S.C. 154(b) by 359 days.

(21) Appl. No.: 12/759,912

(22) Filed: Apr. 14, 2010

(65) Prior Publication Data

US 2011/0254696 A1  Oct. 20, 2011

(51) Int. Cl.
*G08C 15/06* (2006.01)

(52) U.S. Cl. .............................. 340/870.02; 340/870.03

(58) Field of Classification Search ............. 340/870.02, 340/870.03, 505, 870.28, 605, 825.69, 870.04; 370/464, 509, 470, 330, 465; 702/62, 63, 702/60, 61, 45, 50
See application file for complete search history.

(56) References Cited

U.S. PATENT DOCUMENTS

| | | |
|---|---|---|
| 4,315,251 A | 2/1982 | Robinson et al. |
| 4,396,915 A | 8/1983 | Farnsworth et al. |
| 4,614,945 A | 9/1986 | Brunius et al. |
| 4,945,754 A | 8/1990 | Wissman, Jr. et al. |
| 5,031,209 A | 7/1991 | Thornborough et al. |
| 5,184,314 A | 2/1993 | Kelly et al. |
| 5,194,860 A | 3/1993 | Jones et al. |
| 5,377,232 A | 12/1994 | Davidov et al. |
| 5,379,047 A | 1/1995 | Yokev et al. |
| 5,438,329 A | 8/1995 | Gastouniotis et al. |
| 5,451,937 A | 9/1995 | Olson et al. |
| 5,451,938 A | 9/1995 | Brennan, Jr. |
| 5,495,239 A | 2/1996 | Ouellette |
| 5,519,388 A | 5/1996 | Adair, Jr. |
| 5,525,898 A | 6/1996 | Lee, Jr. et al. |
| 5,530,452 A | 6/1996 | Yokev et al. |
| 5,546,318 A | 8/1996 | Lee, Jr. |
| 5,583,517 A | 12/1996 | Yokev et al. |
| 5,592,180 A | 1/1997 | Yokev et al. |
| 5,631,636 A | 5/1997 | Bane |
| 5,684,472 A | 11/1997 | Bane |
| 5,717,718 A | 2/1998 | Rowsell et al. |

(Continued)

FOREIGN PATENT DOCUMENTS

EP  2 161 550 A1  3/2010

OTHER PUBLICATIONS

Andren, Carl; Bozych, Tim; Rood, Bob; and Schultz, Doug, PRISM Power Management Modes, Feb. 1997, pp. 1-7.

(Continued)

*Primary Examiner* — Joseph Lauture
(74) *Attorney, Agent, or Firm* — Dority & Manning, P.A.

(57) ABSTRACT

The present subject matter relates to apparatus and methodologies for determining an appropriate size for a consumption measurement meter to be installed for a particular application, and/or for validating the appropriateness of a previously installed meter. A remotely controllable endpoint is associated with a consumption measure meter, which may be a water meter. Upon remote command to begin a measurement period, the endpoint will store data representing different levels of consumption during different time intervals over a period of time. The time intervals, length of time for recording data, and start time for recording data, may be remotely selected. Analysis of collected data with reference to known characteristics of available consumption measuring meters permits selection and/or validation of an appropriately sized meter for a particular application.

23 Claims, 2 Drawing Sheets

U.S. PATENT DOCUMENTS

| | | | |
|---|---|---|---|
| 5,719,564 | A | 2/1998 | Sears |
| 5,874,903 | A | 2/1999 | Shuey et al. |
| 5,896,097 | A | 4/1999 | Cardozo |
| 5,923,269 | A | 7/1999 | Shuey et al. |
| 5,953,371 | A | 9/1999 | Rowsell et al. |
| 6,006,212 | A | 12/1999 | Schleich et al. |
| 6,014,089 | A | 1/2000 | Tracy et al. |
| 6,088,659 | A | 7/2000 | Kelley et al. |
| 6,100,817 | A | 8/2000 | Mason, Jr. et al. |
| 6,150,955 | A | 11/2000 | Tracy et al. |
| 6,181,294 | B1 | 1/2001 | Porter et al. |
| 6,188,715 | B1 | 2/2001 | Partyka |
| 6,195,018 | B1 | 2/2001 | Ragle et al. |
| 6,234,030 | B1 | 5/2001 | Butler |
| 6,246,677 | B1 | 6/2001 | Nap et al. |
| 6,262,685 | B1 | 7/2001 | Welch et al. |
| 6,329,928 | B1 | 12/2001 | Hershey |
| 6,369,719 | B1 | 4/2002 | Tracy et al. |
| 6,462,713 | B2 | 10/2002 | Porter et al. |
| 6,477,386 | B1 | 11/2002 | Giles |
| 6,628,207 | B1 | 9/2003 | Hemminger et al. |
| 6,867,707 | B1 | 3/2005 | Kelley et al. |
| 6,903,699 | B2 | 6/2005 | Porter et al. |
| 6,963,285 | B2 | 11/2005 | Fischer et al. |
| 6,967,974 | B1 | 11/2005 | Partyka |
| 6,996,215 | B2 | 2/2006 | MacConnell |
| 7,012,546 | B1 | 3/2006 | Zigdon et al. |
| 7,020,532 | B2 | 3/2006 | Johnson et al. |
| 7,042,368 | B2 | 5/2006 | Patterson et al. |
| 7,065,457 | B1 | 6/2006 | Germer et al. |
| 7,106,044 | B1 | 9/2006 | Lee, Jr. et al. |
| 7,145,438 | B2 | 12/2006 | Flen et al. |
| 7,197,408 | B2 | 3/2007 | Ferreira et al. |
| 7,248,181 | B2 | 7/2007 | Patterson et al. |
| 7,283,580 | B2 | 10/2007 | Cumeralto et al. |
| 7,283,916 | B2 | 10/2007 | Cahill-O'Brien et al. |
| 7,317,404 | B2 | 1/2008 | Cumeralto et al. |
| 7,336,200 | B2 | 2/2008 | Osterloh et al. |
| 7,535,378 | B2 | 5/2009 | Cornwall |
| 7,577,181 | B2 | 8/2009 | Cornwall et al. |
| 7,948,396 | B2 | 5/2011 | Cornwall |
| 7,973,673 | B2 * | 7/2011 | Payne et al. ............ 340/870.02 |
| 2002/0063635 | A1 | 5/2002 | Shincovich |
| 2003/0016142 | A1 | 1/2003 | Holmes et al. |
| 2003/0048199 | A1 | 3/2003 | Zigdon et al. |
| 2003/0174067 | A1 | 9/2003 | Soliman |
| 2005/0065743 | A1 | 3/2005 | Cumming et al. |
| 2005/0179561 | A1 | 8/2005 | Osterloh et al. |
| 2005/0237959 | A1 | 10/2005 | Osterloh et al. |
| 2005/0240540 | A1 | 10/2005 | Borleske et al. |
| 2005/0270173 | A1 | 12/2005 | Boaz |
| 2007/0057812 | A1 | 3/2007 | Cornwall |
| 2008/0189054 | A1 | 8/2008 | McAnally et al. |
| 2010/0007521 | A1 | 1/2010 | Cornwall |

OTHER PUBLICATIONS

PCT International Search Report for PCT International Application No. PCT/US06/35508 mailed Aug. 29, 2007.

International Search Report for PCT International Application No. PCT/US2011/029755 completed May 2, 2011, mailed Jun. 1, 2011.

Written Opinion of the International Searching Authority for PCT International Application No. PCT/US2011/029755 completed May 2, 2011, mailed Jun. 1, 2011.

Itron Functionality Profile 50W ERT Module; copyright Itron, Inc. 2003.

Itron Functionality Profile 200W Water Endpoint; copyright Itron, Inc. 2004.

Itron Overview 60W, copyright Itron, Inc. May 2006.

Satish D. Bhakta, Ph.D. and Jon Mueller, Itron White Paper: 100G Datalogging ERT Module: Achieving a 20-Year Battery Life; copyright Itron, Inc. Jan. 2009.

Itron website information "Advanced Metering for Water" copyright Itron, Inc. 2010.

* cited by examiner

METER RIGHT SIZING

FIELD OF THE INVENTION

The present subject matter relates to meters. More particularly, the present subject matter relates to apparatus and methodologies for selecting (i.e., choosing and/or validating) an appropriately sized water meter for a particular application.

BACKGROUND OF THE INVENTION

All mechanical water meters have a maximum continuous flow rate and a maximum intermittent flow rate. The maximum continuous flow rate is the maximum flow rate the meter can continuously withstand without becoming inaccurate and/or otherwise being damaged due to excessive flow. Maximum intermittent flow rates refer to what flow rates can be tolerated for relatively short periods of time only.

Right sizing determinations often involve using a calibrated meter, i.e., a meter that has been tested for accuracy, connected to a data logger. In such applications, flow meters are generally connected to data loggers using high-resolution pulsers capable of producing up to a few hundred pulses for every gallon flowing through the meter. With such configuration, a utility is able to collect accurate data regarding peak and low flow rates encountered over selected time periods. Using such collected data, a utility can then compare the collected flow data with known meter specifications.

If the meter is too big for the application, a smaller, less costly meter can be used that will record water volumes at low flow rates more accurately. On the other hand, if the meter is too small, the meter may be damaged, or otherwise rendered at least partially inaccurate, due to flow rates being too high.

Exemplary previously known water meters associated with encoder-receiver-transmitter (ERT) devices and employed in automatic meter reading (AMR) systems are represented by U.S. Pat. No. 6,262,685 to Welch et al. and U.S. Pat. No. 7,317,404 to Cumeralto et al. both of which are owned by the owner of the present subject matter, and the complete disclosures of which are incorporated herein for all purposes.

While various implementations of water meters have been developed, and while various methodologies have been devised for determining appropriate water meter sizes for particular applications, no design has emerged that generally encompasses all of the desired characteristics as hereafter presented in accordance with the subject technology.

SUMMARY OF THE INVENTION

In view of the recognized features encountered in the prior art and addressed by the present subject matter, improved method and apparatus for determining an appropriate selection of an available water flow measurement meter for a particular environment have been provided.

In an exemplary embodiment, a method is provided for selecting an appropriately sized meter for use in a selected application, comprising associating an encoder-receiver-transmitter (ERT) endpoint with a consumption measuring meter, configuring the endpoint to record consumption data for a selectable time period over selectable length time intervals, comparing recorded data with known meter specifications, and selecting an appropriate meter based on the known meter specifications. It is to be understood by those of ordinary skill in the art that within the present subject matter, "selecting" is intended to encompass both or either of choosing in a first instance, and/or validating the choice of a previously chosen meter.

In more particular embodiments a remotely controllable endpoint may be associated with the consumption measuring meter. In even more particular embodiments, the endpoint may be configured to respond to a remotely transmitted command to record consumption data.

In certain embodiments, the endpoint may be configured to respond to a remotely transmitted command to select the length of the time interval. In other particular embodiments, the endpoint may be configured to select the length of the time interval as an integral portion of one hour, and in yet more particular other embodiments the endpoint may be configured to select the length of the time interval, such as one of 3, 4, 5, 6, 10, 12, 15, 20, 30, and 60 minutes.

In some embodiments, the endpoint may be configured to respond to a remotely transmitted command to select the length of time for recording consumption data. In some such particular embodiments, an endpoint may be configured to select the length of time for recording consumption up to 63 days. In certain embodiments, the endpoint may be configured to sort recorded data based on ranges of consumption, and in particular embodiments an appropriate meter may be selected favoring smaller recorded consumption ranges.

In certain particular embodiments, the endpoint may be configured to sort recorded data based on a number of fixed ranges, such as six fixed ranges corresponding to percentage ranges of a maximum flow rate while in even more particular embodiments the six fixed ranges correspond to 0%, >0%-25%, >25%-50%, >50%-75%, >75%-100%, and >100%

In certain specific embodiments, the encoder-receiver-transmitter (ERT) endpoint may be associated with a water meter.

Yet another present exemplary embodiment relates to a method for determining an appropriate size for a consumption measurement meter to be installed for a particular application, comprising associating a remotely controllable endpoint with a consumption measure meter; under remote command, beginning a measurement period using such endpoint, with such endpoint operative to store data representing different levels of consumption during different time intervals over a period of time, all selected remotely; collecting and analyzing such stored data with reference to known characteristics of available consumption measuring meters; and based on such analysis, selecting an appropriately sized meter for a particular application.

It is to be understood that the present subject matter equally relates to both methodology and corresponding apparatus. For example, in further embodiments, the present subject matter relates to apparatus for permitting selection of an appropriately sized meter for use in a selected application, comprising a consumption measuring meter and an encoder-receiver-transmitter (ERT) endpoint configured to record consumption data for a selectable time period over selectable length time intervals. In such embodiment, preferably recorded data read from such endpoint may be compared with known meter specifications to permit selecting an appropriate meter based on the known meter specifications.

In more particular embodiments, the endpoint may be configured to enable remote activation of a consumption usage measurement period, to remotely configure measurement intervals, and to remotely select measurement time periods.

In certain alternative embodiments, a present exemplary endpoint may be configured to sort recorded data based on ranges of consumption. In more particular present exemplary embodiments, an endpoint may be configured to sort recorded data based on six fixed ranges corresponding to percentage ranges of a maximum flow rate while in even more particular embodiments the fixed ranges correspond to 0%, >0%-25%, >25%-50%, >50%-75%, >75%-100%, and >100%.

In certain particular embodiments, the consumption measuring meter may be a water meter.

Additional objects and advantages of the present subject matter are set forth in, or will be apparent to, those of ordinary skill in the art from the detailed description herein. Also, it should be further appreciated that modifications and variations to the specifically illustrated, referred and discussed features and elements hereof may be practiced in various embodiments and uses of the present subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the present subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the present subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

Figure 1:
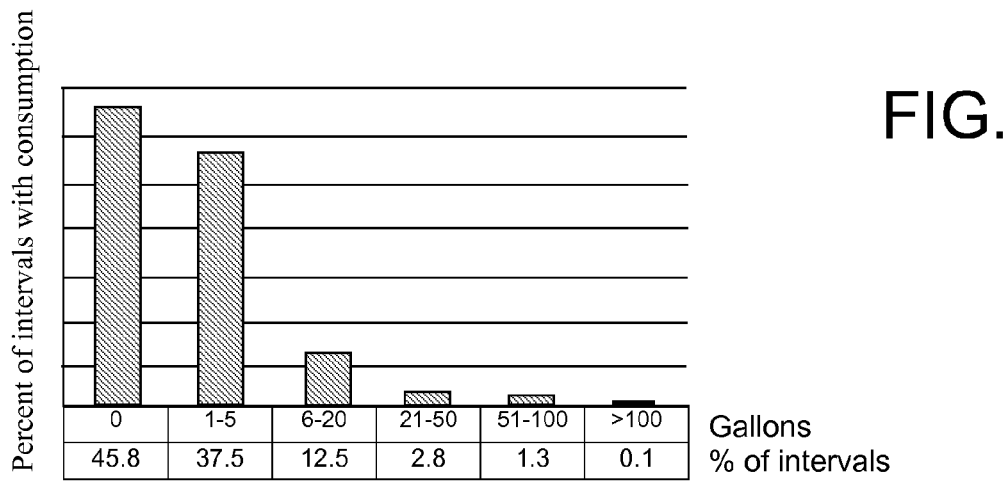
FIG. 1 graphically illustrates an exemplary measured consumption profile showing the percentages of intervals in a specified time period having particular consumption values.

Repeat use of reference characters throughout the present specification and appended drawings is intended to represent same or analogous features, elements, or steps of the present subject matter.

DETAILED DESCRIPTION OF THE PREFERRED EMBODIMENTS

As discussed in the Summary of the Invention section, the present subject matter is particularly concerned with improved apparatus and methodology for evaluating water flow rates to determine an appropriate size selection from available water meters for use in a particular water flow measurement application.

Selected combinations of aspects of the disclosed technology correspond to a plurality of different embodiments of the present subject matter. It should be noted that each of the exemplary embodiments presented and discussed herein should not insinuate limitations of the present subject matter. Features or steps illustrated or described as part of one embodiment may be used in combination with aspects of another embodiment to yield yet further embodiments. Additionally, certain features may be interchanged with similar devices or features not expressly mentioned which perform the same or similar function.

Figure 4:
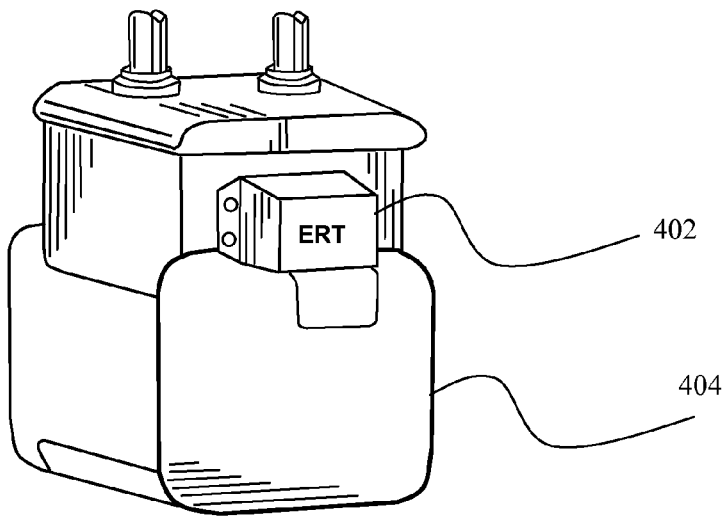
FIG. 4 represents an exemplary arrangement of a representative encoder-receiver-transmitter (ERT) associated with a representative water meter per present disclosure.

Reference will now be made in detail to the presently preferred embodiments of the subject meter sizing apparatus and methodology. The present subject matter is directed to water flow, or more generally, fluid flow, measuring technology that may be incorporated into automatic meter reading (AMR) encoder-receiver-transmitter (ERT) endpoints either by new installation or by software activation of endpoints already installed in the field. Exemplary such water endpoints include, for example, the 60 W ERT Water Endpoint and the 200 W ERT Water Endpoint, both manufactured by Itron, Inc., the owner of the present technology. A general representation of an ERT generally 402 associated with a representative water meter generally 404 in accordance with present subject matter is seen in FIG. 4.

Generally such devices are battery operated devices that measure water flow and periodically report measurement readings upon command from, for example, radio-based handheld or mobile readers as well as via advanced metering infrastructure (AMI) network collection and control systems. Such devices may also offer other services including, for example, leak, reverse-flow, and tamper detection. In certain instances, the devices may be remotely programmed by way of the previously mentioned radio-based devices and/or network systems.

The present subject matter is directed to such devices and provides enhanced functionality corresponding to a special meter right sizing function implemented in an encoder-receiver-transmitter (ERT) water endpoint associated with a water meter. In accordance with present technology, this right sizing function may correspond to a module included in all of a particular category of ERT water endpoints that may be selectively activated by any of the previously mentioned radio-based devices and/or network systems. In certain embodiments of the present subject matter, the module may be implemented in software stored in permanent (ROM) memory incorporated into an ERT water endpoint or may be downloaded and selectively stored in temporary (RAM) memory or more permanent memory incorporated into the endpoint. In general, in preferred embodiments the system may record normal billing data at the same time that right sizing is being performed. In that sense, the present subject matter need not be thought of as comprising a special ERT, but may be considered as being a special function provided in an otherwise existing or provided ERT apparatus.

The data collecting module providing the meter right sizing functionality in accordance with present technology, when configured and activated by any of the previously mentioned radio-based devices and/or network systems, will collect interval data in intervals and sort them into quantity consumed "buckets" representing various ranges of consumption. The data collection intervals may be as short as three minutes, with a typical value of fifteen minutes, but may be adjusted to any suitable interval. In an exemplary configuration, six buckets may be provided, whose ranges are set for the various meters during installation.

In operation, the right sizing module of the present technology will run for a specified number of days, and, at the end of that time, the data can be extracted by way of the previously mentioned radio-based devices and/or network systems. The data reported will represent the usage of the meter in time increments to help correctly size the meter. This data can be represented in a histogram where selected consumption ranges represent selected ones of the previously mentioned "buckets." Recording both the number of intervals and the total flow for a specific rate allows the meter usage to be characterized.

In accordance with exemplary present technology, the selection of fifteen-minute recording intervals provides the possibility of having smaller sampling rates that would offer the utility better information about peak flow rates. This present technology is not intended to replace data loggers, but makes it possible for utilities to have enough information to help them determine which meters are likely to be undersized or oversized.

With reference now to the Figures, a better understanding of the present technology may be obtained by way of the illustrated examples. With reference to FIG. 1, there is graphically illustrated an exemplary measured consumption profile showing the percentages of intervals in a specified time period having particular consumption values. In this example, the right sizing module is run for thirty (30) days on a meter with one (1) gallon resolution. As illustrated along the horizontal axis, right sizing ranges (buckets) are chosen as 0, 1-5, 6-20, 21-50, 51-100, >100 gallons.

In this example, every fifteen (15) minutes, the meter reads the interval, and determines the consumption. The measured consumption is then compared to the above ranges, and the correct range will be chosen. The value for that range will then be incremented, and the total flow for that range will be updated by the number of units measured. At the end of thirty (30) days the data can be read. With exemplary measurement intervals lasting six minutes each, it will appreciate that there will be 7200 intervals in thirty (30) days.

Figure 2:
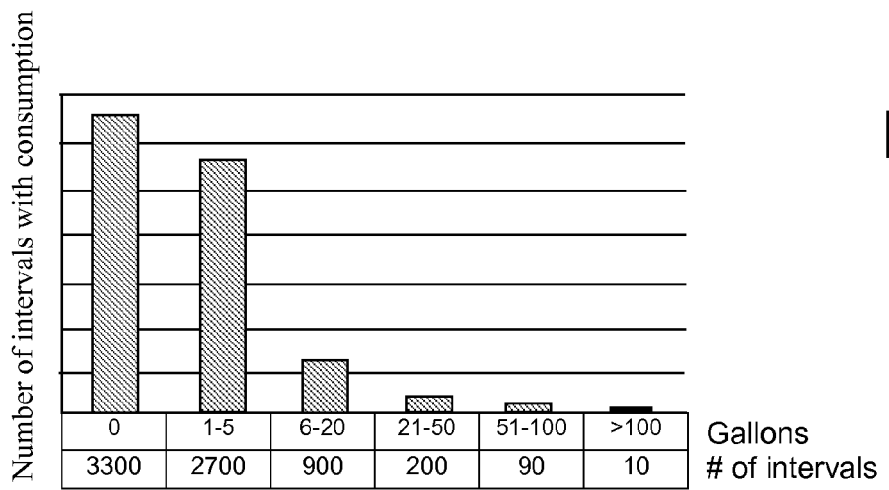
FIG. 2 graphically illustrates an exemplary measured consumption profiles showing the number of intervals in a specified time period having particular consumption values.
Figure 3:
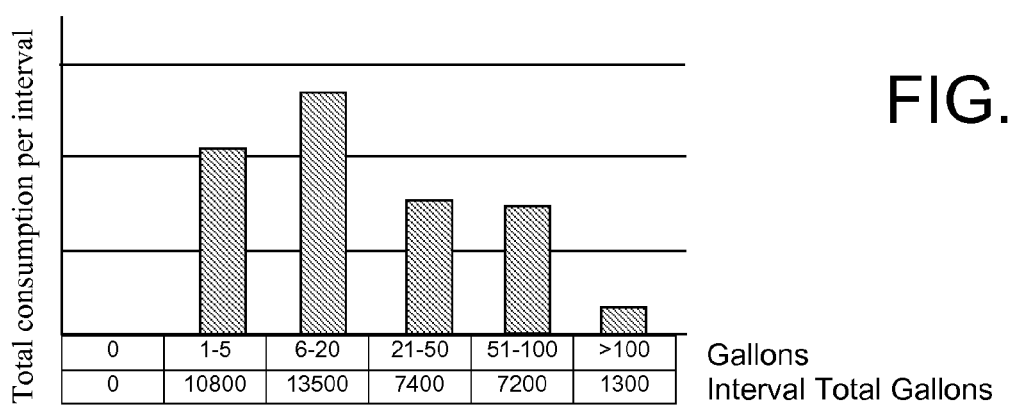
FIG. 3 graphically illustrates an exemplary measured consumption profile showing the total consumption per interval in a specified time period.

As may be seen from the example of FIGS. 2 and 3, over a thirty (30) day measurement period, during 3300 intervals, no water flow was detected. For 2700 intervals, a total of 10,800 gallons was consumed in a range of 1-5 gallons. Similarly, in 900 intervals, 6-20 gallons were consumed for a total of 13,500 gallons; in 90 intervals, 51-100 gallons were consumed for a total of 7200 gallons; and in 10 intervals more than 100 gallons were consumed for a total of 1300 gallons. In this example, per the present subject matter, the meter should be sized to favor the smaller recorded consumption ranges, as there were very few times where more than 100 gallons was consumed in 15 minutes. This allows the meter to be sized for optimum accuracy.

In exemplary configurations, right sizing measurement duration may be set to a maximum number of days, such as 63 days so as to limit data size. Further, right sizing data can be scheduled to start at a specified time after the setup command, for example, up to 63 days from the setup command (i.e., from configuring an endpoint). Right sizing intervals are generally set to 15 minute integrals, but may be otherwise selectable, such as 3, 4, 5, 6, 10, 12, 15, 20, 30 and 60 (minutes). In an exemplary configuration, a default setting may be 15 minutes.

Generally six fixed right size buckets may be established with sizes as a percent of the maximum flow. In an exemplary configuration, such may correspond to 0%; >0%-25%; >25%-50%; >50%-75%; >75%-100%; and >100%. A maximum flow may be is set in a manual mode or pre-selected in automatic mode. In an automatic mode, the maximum flow can be the peak interval value from the last right sizing (scaled if the interval changed), or the greatest hourly interval in the past forty (40) days, scaled appropriately for the interval. If no other value is available the automatic mode may be configured to default to 4.

The peak interval value is returned in the data. If an error occurs, or overflow or reverse flow count is encountered in the interval, the current interval and subsequent intervals are discarded until a valid interval is read. Any negative or zero values are considered to be a zero flow, and are included in the 0% bucket.

It will be appreciated that since there is no total flow in a 0% bucket, only the number of intervals for this bucket is returned. The rest of the buckets are returned as the number of intervals in the buckets as well as the total flow in the respective buckets.

Figure 5:
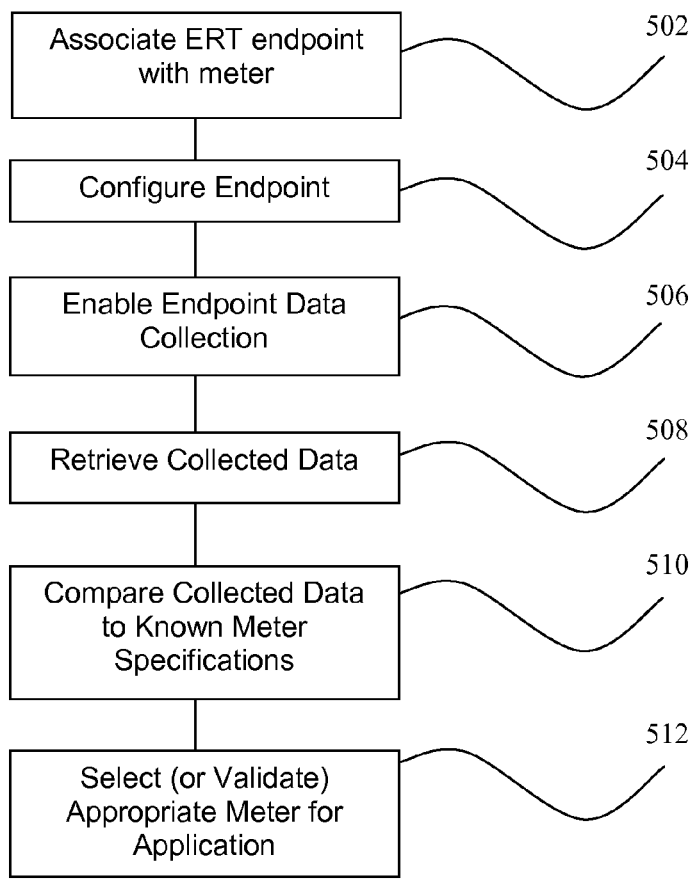
FIG. 5 is a flow chart illustrating exemplary methodology of the present subject matter.

The general methodology of the present technology may be better understood with reference to the representative flow chart illustrated in FIG. 5. As may be seen in FIG. 5, at step 502 an ERT endpoint is associated with a meter, for example, as shown in FIG. 4. In a manner understood by those of ordinary skill in the art without disclosure of additional detail, the ERT endpoint is configured to record flow measurement data based on fluid flow through the meter with which it is associated and to communicate such recorded data to a reader. In general, such reading may correspond to such as a hand-held reader, a mobile reader mounted in a vehicle, and/or an automatic meter infrastructure (AMI) capable of reading data over a network, all as understood by those of ordinary skill in the art without additional discussion.

In accordance with present technology, each of the aforementioned reader technologies also are provided with the capability of transmitting instructions to the ERT endpoint and meter combination to configure the endpoint as illustrated in step 504. Such configuration may include the setting of data collection intervals and data collection time periods as well as instructions to enable a data collection cycle as illustrated at step 506.

Following a data collection period, collected data is retrieved as illustrated at step 508 by any of the previously mentioned readers, and such collected data is compared to known meter specifications (step 510) to enable selection of an appropriate meter for the particular application (step 512). It is to be understood by those of ordinary skill in the art that within the present subject matter, "to select" is intended to encompass both or either of choosing in a first instance, and/or validating the choice of a previously chosen meter.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure and appended claims are not intended as precluding inclusion of such modifications, variations and/or additions to the present subject matter as would be readily apparent to one of ordinary skill in the art.

What is claimed is:

1. A method for selecting an appropriately sized meter for use in a selected application, comprising;
   associating an encoder-receiver-transmitter (ERT) endpoint with a consumption measuring meter;
   configuring the endpoint to record consumption data for a selectable time period over selectable length time intervals;

comparing recorded data with known meter specifications; and selecting an appropriate meter based on the known meter specifications.

2. The method of claim 1, wherein the step of associating further comprises associating a remotely controllable endpoint with a consumption measuring meter.

3. The method of claim 2, wherein the step of configuring further comprises configuring the endpoint to respond to a remotely transmitted command to record consumption data.

4. The method of claim 2, wherein the step of configuring further comprises configuring the endpoint to respond to a remotely transmitted command to select the length of the time interval.

5. The method of claim 4, wherein the step of configuring further comprises configuring the endpoint to select the length of the time interval as an integral portion of one hour.

6. The method of claim 5, wherein the step of configuring further comprises configuring the endpoint to select the length of the time interval as one of 3, 4, 5, 6, 10, 12, 15, 20, 30, and 60 minutes.

7. The method of claim 2, wherein the step of configuring further comprises configuring the endpoint to respond to a remotely transmitted command to select the length of time for recording consumption data.

8. The method of claim 7, wherein the step of configuring further comprises configuring the endpoint to select the length of time for recording consumption up to 63 days.

9. The method of claim 2, wherein the step of configuring further comprises configuring the endpoint to respond to a remotely transmitted command to select the start time for recording consumption data.

10. The method of claim 9, wherein the step of configuring further comprises configuring the endpoint to select the start time for recording consumption up to 63 days after configuring the endpoint.

11. The method of claim 1, further comprising:
configuring the endpoint to sort recorded data based on ranges of consumption; and
selecting an appropriate meter favoring smaller recorded consumption ranges.

12. The method of claim 11, wherein the step of configuring the endpoint to sort recorded data further comprises configuring the endpoint to sort recorded data based on six fixed ranges corresponding to percentage ranges of a maximum flow rate.

13. The method of claim 12, wherein the six fixed ranges correspond to 0%, >0%-25%, >25%-50%, >50%-75%, >75%-100%, and >100%.

14. The method of claim 1, wherein the step of associating comprises associating an encoder-receiver-transmitter (ERT) endpoint with a water meter.

15. The method of claim 1, wherein the step of selecting an appropriate meter includes validating selection of a previously selected meter.

16. A method for determining an appropriate size for a consumption measurement meter to be installed for a particular application, comprising:
associating a remotely controllable endpoint with a consumption measure meter;
under remote command, beginning a measurement period using such endpoint, with such endpoint operative to store data representing different levels of consumption during different time intervals over a period of time, all selected remotely;
collecting and analyzing such stored data with reference to known characteristics of available consumption measuring meters; and
based on such analysis, selecting an appropriately sized meter for a particular application.

17. Apparatus for permitting selection of an appropriately sized meter for use in a selected application, comprising;
a consumption measuring meter; and
an encoder-receiver-transmitter (ERT) endpoint configured to record consumption data for a selectable time period over selectable length time intervals,
whereby recorded data read from said endpoint may be compared with known meter specifications to permit selecting an appropriate meter based on known meter specifications.

18. The apparatus of claim 17, wherein the endpoint is configured to enable remote activation of a consumption usage measurement period, to remotely configure measurement intervals, and to remotely select measurement time periods.

19. The apparatus of claim 18, wherein the endpoint is configured to sort recorded data based on ranges of consumption.

20. The apparatus of claim 19, wherein the endpoint is configured to sort recorded data based on fixed ranges corresponding to percentage ranges of a maximum flow rate.

21. The apparatus of claim 20, wherein said fixed ranges comprise six fixed ranges corresponding to 0%, >0%-25%, >25%-50%, >50%-75%, >75%-100%, and >100%.

22. The apparatus of claim 17, wherein said consumption measuring meter is a water meter.

23. The apparatus of claim 17, further configured so that recorded data read from said endpoint may be compared with known meter specifications to permit validation of a previously selected meter as an appropriate meter based on such known meter specifications.

* * * * *